United States Patent [19]

Lindner et al.

[11] Patent Number: 5,248,727
[45] Date of Patent: Sep. 28, 1993

[54] VINYL CHLORIDE POLYMER BASED MOULDING COMPOSITIONS WITH REDUCED FOGGING

[75] Inventors: Christian Lindner; Adolf Schmidt, both of Cologne; Herbert Eichenauer, Dormagen; Karl-Erwin Piejko, Bergisch-Gladbach; Karl-Heinz Ott, Leverkusen, all of Fed. Rep. of Germany

[73] Assignee: Bayer Aktiengesellschaft, Leverkusen, Fed. Rep. of Germany

[21] Appl. No.: 892,397

[22] Filed: May 18, 1992

Related U.S. Application Data

[63] Continuation-in-part of Ser. No. 533,005, Jun. 4, 1990, abandoned.

[30] Foreign Application Priority Data

Jun. 15, 1989 [DE] Fed. Rep. of Germany ....... 3919548

[51] Int. Cl.$^5$ ................. C08L 27/06; C08L 27/08; C08L 55/02
[52] U.S. Cl. .................... 525/70; 525/239; 560/86; 560/98; 560/127; 560/194; 560/204
[58] Field of Search .................. 525/70, 239

[56] References Cited

U.S. PATENT DOCUMENTS

| 4,518,743 | 5/1985 | Lindner et al. | 525/80 |
| 4,772,743 | 9/1988 | Schmidt et al. | 560/86 |

FOREIGN PATENT DOCUMENTS

| 255594 | 2/1988 | European Pat. Off. |
| 3640337 | 6/1988 | Fed. Rep. of Germany |
| 15213 | 8/1981 | German Democratic Rep. |
| 159718 | 3/1983 | German Democratic Rep. |

Primary Examiner—James J. Seidleck
Assistant Examiner—W. R. M. Clark
Attorney, Agent, or Firm—Connolly and Hutz

[57] ABSTRACT

Thermoplastic molding compositions of a vinyl chloride polymer and one or more emulsion polymers made with special emulsifiers have improved properties for technical application, such as reduced fogging. They are used for the production of molded articles, sheet products and films.

16 Claims, No Drawings

VINYL CHLORIDE POLYMER BASED MOULDING COMPOSITIONS WITH REDUCED FOGGING

This application is a continuation-in-part of application Ser. No. 07/533,005 filed on Jun. 4, 1990, now abandoned.

This invention relates to thermoplastic moulding compositions of a vinyl chloride polymer and one or more emulsion polymers made with special emulsifiers and to their use for the production of moulded articles, sheet products and films with improved properties for technical application, such as the reduced fogging.

Vinyl chloride polymers and mixtures of vinyl chloride polymers with rubbers and/or resinous vinyl polymers have a wide range of application in many different fields in which plastics are used.

The other polymers added to the vinyl chloride polymers are frequently prepared by emulsion polymerisation, leaving a part of the emulsifiers used for emulsion polymerisation in the polymer and thus affecting the physical properties of the polymer mixtures, The flow properties and the colour of such blends are particularly influenced by the emulsifiers present in the polymer. The fogging of these blends is worsened by the presence of the volatile emulsifier constituents.

This invention relates to thermoplastic moulding compositions of
A) from 10 to 95% by weight of a vinyl chloride polymer and
B) from 90 to 5% by weight of one or more thermoplastic polymer selected from
 B1) rubber polymers,
 B2) graft polymers and
 B3) vinyl polymers,
B1), B2) and B3) having been prepared by emulsion polymerisation in the presence of emulsifiers obtained by the reaction of 1 mol of a diol corresponding to formula (I)

HO—M—OH     (I)

wherein
M stands for

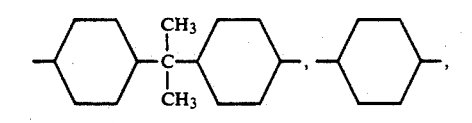

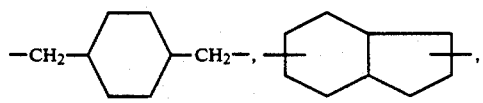

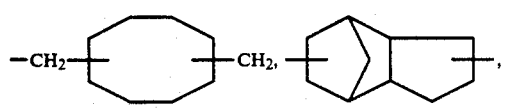

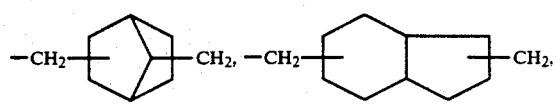

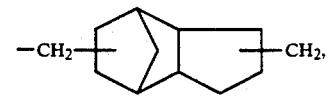

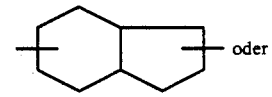

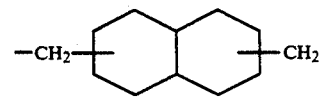

with 2 mols of a carboxylic acid anhydride corresponding to formula (II), (III) and/or (IV),

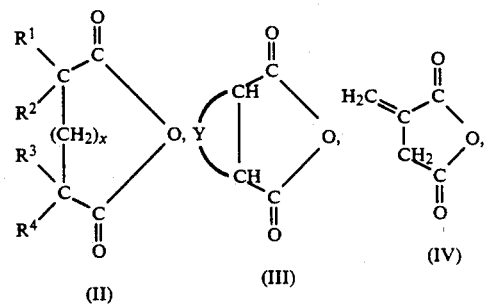

in which, when x= =:
$R^1$, $R^2$, $R^3$ and $R^4$ denote hydrogen or $R^1$ and $R^3$, which may be identical or different, denote hydrogen or $C_1$ to $C_{35}$ alkyl or alkenyl and $R^2$ and $R^4$ denote hydrogen or
$R^1$ and $R^4$ denote a chemical bond and $R^2$ and $R^3$ form an o-phenylene group together with the carbon atoms and
when x=1:
$R^1$, $R^2$, $R^3$ and $R^4$ denote hydrogen and
Y stands for

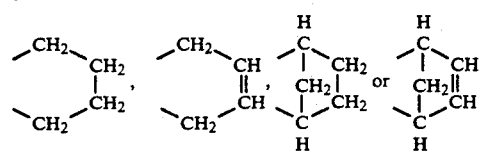

at temperatures from 100° to 300° C. under an inert gas followed by conversion of the resulting compounds into alkali metal or ammonium salts.

The following are examples of suitable diols:
2,2-bis-(4-hydroxycyclohexyl)-propane,
1,4-cyclohexane diol,
1,4-bis-hydroxymethyl-cyclohexane,
Bis-hydroxymethyl-hexahydro-4,7-methanoindan (commercially available as "TDC Diol" prepared by hydroformylation of dicyclopentadiene),
Bis-hydroxymethyl-bicyclo-(4,3,0)-nonane,
Bis-hydroxymethyl-norbornane and Bis-hydroxymethyl-cyclooctane.

Most of the diols mentioned above are isomeric mixtures.

The following are examples of suitable anhydrides:
Hexahydrophthalic acid anhydride,
Tetrahydrophthalic acid anhydride,
5-norbornene-2,3-dicarboxylic acid anhydride,
Nornornane dicarboxylic acid anhydride,
Maleic acid anhydride and
Itaconic acid anhydride.

The last two anhydrides mentioned are preferably reacted with the above mentioned diols in combination with saturated anhydrides.

Preferred emulsifiers are those corresponding to the following formulae:

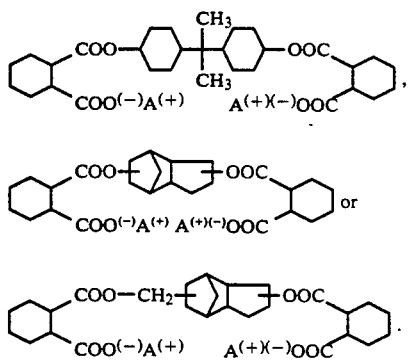

The emulsifiers corresponding to the following formula

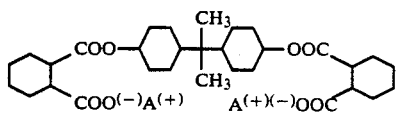

in which A=an alkalimetal, preferably Na and/or K, or ammonium, is particularly preferred.

The thermoplastic moulding compositions according to the invention are preferably composed of from 20 to 95% by weight, even more preferably from 25 to 85% by weight of a vinyl chloride polymer A and from 80 to 5% by weight, even more preferably from 75 to 15% by weight, of a thermoplastic polymer B.

B1) rubber polymers, B2) graft polymers and B3) vinyl polymers, which are added to the vinyl chloride polymer as thermoplastic component B, are preferably used in the following relative amounts:
20 to 50 parts by weight of B1):
80 to 20 parts by weight of B2):
0 to 30 parts by weight of B3).

The vinyl chloride polymer A may be a polyvinyl chloride or polyvinyl chloride polymer such as a copolymer with a vinylalkyl ether, maleic acid anhydride, maleic acid semiester, maleic acid ester or alkyl methacrylate. The vinylchloride polymers generally have molecular weights of from 50,000 to 2,000,000.

The rubber polymers B1) may be diene rubbers such as polybutadiene, polyisoprene or polychloroprene, butadiene copolymers with vinyl monomers such as styrene, acrylonitrile, alkyl (meth)acrylate or vinyl ethers, alkyl acrylates such as ethyl, butyl or hexyl acrylate, alkyl acrylate rubbers such as polyethyl, polybutyl or polyhexyl acrylate, copolymers of at least 50% by weight of an alkyl acrylate such as n-propyl, n-butyl or hexyl acrylate with vinyl monomers such as acrylonitrile, styrene, alkyl methacrylate, vinyl acetate or vinyl ether; also, olefine rubbers such as, for example, copolymers of ethylene and comonomers such as propylenes diene monomers, vinyl acetate, alkyl acrylate and carbon monoxide. The above mentioned rubbers may be in a crosslinked or uncross-linked state. They have a glass temperature $T_g$ of $\leq 0°$ C. .

The graft polymers B2) are polymers i which styrene, α-methylstyrene, methyl methacrylate or a mixture of 95 to 50% by weight of styrene, a-methylstyrene, styrene substituted in the nucleus, methyl methacrylate or mixtures thereof and 5 to 50% by weight of acrylonitrile, methacrylonitrile, maleic acid anhydride, N-substituted maleimide, methyl methacrylate or mixtures thereof (graft) are graft polymerised on a rubber having a glass temperature $T_g \leq 0°$ C. (graft basis).

Rubbers suitable for the preparation of the graft polymers B2) include in particular polybutadiene, butadiene/styrene copolymers (both of which may be copolymerised with up to 30% by weight, based on the weight of the rubber, of a lower alkyl ester of acrylic or methacrylic acid, such as methyl methacrylate, ethyl acrylate, methyl acrylate or ethyl methacrylate), polyisoprene, polychloroprene and alkyl acrylate rubbers (obtained from $C_1$ to $C_8$ alkyl acrylates, in particular ethyl, butyl and ethylhexyl acrylate). The alkyl acrylate rubbers may contain up to 30% by weight, based on the weight of the rubber, of monomers such as vinyl acetate, acrylonitrile, styrene, methyl methacrylate and/or vinyl ethers incorporated by copolymerisation and minor quantities, preferably up to 5% by weight, based on the weight of the rubber, of ethylenically unsaturated monomers which have a cross-linking action. Examples of such cross-linking agents include alkylene diol di(meth)acrylates, polyester di(meth)acrylates, divinyl benzene, trivinyl benzene, triallyl cyanurate, allyl (meth)acrylate, butadiene and isoprene. Acrylate rubbers which contain a cross-linked diene rubber of one or more conjugated dienes and optionally an ethylenically unsaturated monomer such as styrene and/or acrylonitrile as nucleus may also be used. EPDM rubbers, i.e. rubbers obtained from ethylene, propylene and an unconjugated diene, ant silicone rubbers are further examples of suitable rubbers.

Diene rubbers and alkyl acrylate rubbers are preferred rubbers for the preparation of the graft polymers B2).

Acrylate rubbers which have a core/shell structure are particularly advantageous, i.e. rubbers which contain a core of a different polymer enclosed in a shell of cross-linked alkyl acrylate rubber.

The rubbers are present in the graft polymer B2) in the form of at least partially cross-linked particles having an average particle diameter of from 0.05 to 5 μm, in particular from 0.075 to 1 μm. They preferably have gel contents of from 99 to 70% by weight and the rubber content in the graft polymer B2) is from 5 to 90% by weight, preferably from 20 to 90% by weight.

Particularly suitable vinyl polymers (B3) are copolymers of styrene, α-methylstyrene, p-methylstyrene, acrylonitrile, methacrylonitrile and/or alkyl methacrylates such as methyl or cyclohexyl methacrylate.

The emulsifiers used in the production of thermoplastic polymers B) may be prepared by the reaction of a diol with a suitable carboxylic acid anhydride. The reaction may be represented by the following reactive scheme:

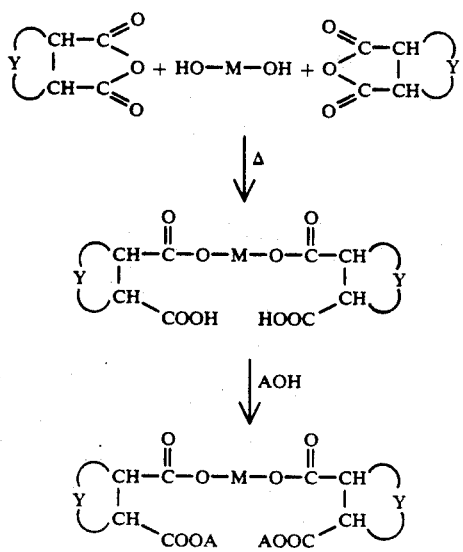

A = alkali metal.

The diol is reacted with the carboxylic acid anhydrides, preferably at temperatures from 40 to 280° C., optionally under an inert gas (nitrogen).

The emulsifiers according to this invention may be used in the form of their salts such as conventional anionic emulsifiers, e.g. salts of higher fatty acids, resinic acids, aliphatic or aromatic sulphonic acids or sulphuric acid semiesters. They may in particular be used in the form of an aqueous alkali metal solution at a pH of about 13 to 7.5. The emulsifiers are normally present in the aqueous alkaline solution in a quantity of from 2 to 50% by weight, preferably from 5 to 20% by weight.

Based on the monomer or monomer mixture to be polymerised, the emulsifiers according to the invention are used in quantities of about 0.05 to 5% by weight, preferably from 1 to 3% by weight. It is particularly advantageous if the well known conventional anionic emulsifiers are used in the initial phase of polymerisation and the emulsifiers according to the invention are only introduced subsequently into the polymerising system in the course of emulsion polymerisation. The initial phase is regarded as the phase up to a monomer conversion of 30% by weight, in particular from 5 to 20% by weight.

In emulsion polymerisations carried out in several stages (e.g. in two stages), as in graft polymerisation, any of the following procedures may in principle be adopted:

a) the whole of polymerisation is carried out with the emulsifiers according to the invention,
b) the emulsifiers according to the invention are used in the first stage and the conventional emulsifiers in the second stage or
c) conventional emulsifiers are used in the first stage and the emulsifiers according to the invention are used in the second stage.

Variation c) is particularly preferred and leads to polymers with exceptionally advantageous properties, such as good fogging characteristics.

The emulsion obtained has solids contents of up to 60% by weight, preferably up to 45% by weight. The emulsions may be worked up in known manner, either by electrolyte coagulation or by drying processes such as spray drying.

The moulding compositions according to the invention can be prepared by the usual coprecipitation of the latices of their constituents or by melt compounding of the constituents.

The moulding compounds according to the invention have improved dimensional stability under heat and substantially diminished fogging. Fogging of the moulding compounds is described in the examples which follow.

The moulding compounds according to the invention may be used for the production of moulded articles, such as sheets and films.

EXAMPLES

I. Emulsifiers used:

I.1 sodium salt of disproportionated abietic acid (comparison)

I.2 sodium salt of $C_{14}$–$C_{18}$ alkyl sulphonic acids (comparison)

I.3 bis-Na salt of the reaction product of 1 mol of perhydro-bisphenol A and 2 mol of hexahydrophthalic acid anhydride.

Preparation of the Graft Polymers (Component B2)) According to the claims

II. Rubbers used as grafting bases:

II.1 Emulsion of coarse particled cross-linked polybutadiene having an average particle diameter of 400 nm ($d_{50}$) and a gel content of 93% by weight, prepared by means of emulsifier I.1, soldis content 49% by weight.

II.2 Emulsion of a coarse particled cross-linked polybutadiene having an average particle diameter of 405 nm ($d_{50}$) and a gel content of 92% by weight, prepared by means of emulsifier I.3, soldis content 52% by weight.

II.3 Emulsion of a finely divided cross-linked polybutadiene having an average particle diameter of 110 nm ($d_{50}$) and a gel content of 93% by weight, prepared by means of emulsifier I.1, solids content 42% by weight.

II.4 Emulsion of a finely divided cross-linked polybutadiene having an average particle diameter of 115 nm ($d_{50}$) and a gel content of 91% by weight, prepared by means of emulsifier I.3, solids content 42% by weight.

III. Graft polymers:

Graft polymers III.1 to III.6 are prepared using the material amounts shown in the following Table I.

TABLE I

| Graft polymers | III.1*) parts by weight | III.2 parts by weight | III.3 parts by weight | III.4 parts by weight | III.5 parts by weight | III.6 parts by weight |
|---|---|---|---|---|---|---|
| Starting material | | | | | | |
| Emulsion II.2 | | 408 | 408 | 408 | 408 | |
| Emulsion II.4 | | | 504 | | 504 | |
| Emulsion II.3 | 504 | 504 | | 504 | | 504 |

TABLE I-continued

| Graft polymers | III.1*) parts by weight | III.2 parts by weight | III.3 parts by weight | III.4 parts by weight | III.5 parts by weight | III.6 parts by weight |
|---|---|---|---|---|---|---|
| Emulsion II.1 | 424 | | | | | 424 |
| Water | 1180 | 1180 | 1180 | 1180 | 1180 | 1180 |
| Initiator | | | | | | |
| Potassium peroxidisulphate | 10 | 10 | 10 | 10 | 10 | 10 |
| Water | 400 | 400 | 400 | 400 | 400 | 400 |
| Graft monomers | | | | | | |
| Styrene | 644 | 644 | 644 | 644 | 644 | 644 |
| Acrylonitrile | 322 | 322 | 322 | 322 | 322 | 322 |
| Emulsifier | | | | | | |
| Water | 260 | 260 | 260 | 260 | 260 | 260 |
| I.1 | 35 | 35 | 35 | | | |
| I.3 | | | | 35 | 35 | 35 |
| 1N-sodium hydroxide solution | 40 | 40 | 40 | 40 | 40 | 40 |

*)Comparison

Emulsion II is mixed with water and the initiator at 60° C. under stirring. Graft monomers and emulsifier are then introduced in the course of 7 hours at 60° C. Polymerisation is then completed within 4 hours. After stabilization of the emulsion with 1.2% by weight (based on the polymer solids content) of a phenolic antioxidant, the emulsions are worked up into a powder by coagulation with an aqueous $MgSO_4$ solution and dried.

Preparation of the Rubber Polymers (Component B1) According to the Claims)

IV. Rubber emulsions used:

IV.1 Emulsion of a copolymer of 70% by weight of butadiene and 30% by weight of acrylonitrile having an average particle diameter ($d_{50}$) of 120 nm and a gel content of 88% by weight, polymer solids of the emulsion 25.5% by weight. The emulsion is prepared with emulsifier I.1.

IV.2 Emulsion of a copolymer having the composition described for IV.1. Average particle diameter ($d_{50}$) 110 nm; gel content 90% by weight, polymer solids in emulsion 25.7% by weight. The emulsion was prepared with emulsifier I.2.

IV.3 Emulsion of a copolymer having the composition described for IV.1. Average particle diameter ($d_{50}$) 125 nm; gel content 89% by weight, polymer solids in emulsion 25.5% by weight. The emulsion was prepared with emulsifier I.3.

The rubbers were recovered from the latices in combination with the graft polymers described above, i.e. by electrolyte coagulation of suitable latex mixtures of graft polymer and rubber.

V. Fogging of the graft polymers III.1 to III.6 (window fogging test 3 h/100° C.) according to DIN 75 201):

| Graft polymer | Gloss value % |
|---|---|
| III.1*) | 77 |
| III.2 | 84 |
| III.3 | 86 |
| III.4 | 88 |
| III.5 | 94 |
| III.6 | 93 |

*)comparison

VI. Properties of the PVC moulding compounds

Varying qualities of polyvinyl chloride (K value are combined with varying quantities of different polymers for the preparation of the moulding compounds described below. 2% by weight of BaCD laurate (solid), 0.3% by weight of sterically hindered phenolic antioxidant (solid) and 0.2% by weight of ester wax are added in each case as necessary stabilizer and lubricant. The moulding compounds are homogenized an mixing rollers at 180° C. for 10 minutes and pressure moulded at 190° C. to form test samples. Composition and properties are summarized in Tables II and III:

TABLE II

| | Properties of the moulding compounds | | | | | |
|---|---|---|---|---|---|---|
| Example | Tensile strength DIN 53 455 MPa | Elongation DIN 53 455 % | Tear Propagation Resistance DIN 53 515/ mm | Shore Hardness DIN 53 505 D, 15" | Vicat A DIN 53 359 °C. | Cold Strength DIN 53 372 °C. |
| VI.1*) | 22 | 200 | 103 | 57 | 86 | |
| VI.2 | 23 | 213 | 101 | 55 | 86 | |
| VI.3 | 24 | 225 | 108 | 56 | 85 | |
| VI.4 | 26 | 230 | 115 | 55 | 86 | |
| VI.5 | 26 | 239 | 115 | 55 | 87 | |
| VI.6 | 23 | 210 | 108 | 57 | 87 | |
| VI.7*) | 24 | 260 | 73 | 51 | 77 | −35 |
| VI.8 | 26 | 290 | 73 | 50 | 85 | −40 |
| VI.9 | 28 | 290 | 74 | 51 | 87 | −42 |
| VI.10 | 26 | 285 | 73 | 50 | 86 | −38 |
| VI.11 | 28 | 300 | 88 | 50 | 86 | −42 |

*)Comparison

TABLE III

| Type | PVC | Graft polymers (B2) | | | | | | Rubbers (B1) | | | Diisodecyl-phthalate |
| --- | --- | --- | --- | --- | --- | --- | --- | --- | --- | --- | --- |
| | | III.1 | III.2 | III.3 | III.4 | III.5 | III.6 | IV.1 | IV.2 | IV.3 | |
| VI.1*) | 40 | 40 | | | | | | | | | 20 (Vergleich) |
| VI.2 | 40 | | 40 | | | | | | | | 20 |
| VI.3 | 40 | | | 40 | | | | | | | 20 |
| VI.4 | 40 | | | | 40 | | | | | | 20 |
| VI.5 | 40 | | | | | 40 | | | | | 20 |
| VI.6 | 40 | | | | | | 40 | | | | 20 |
| VI.7*) | 40 | 27 | | | | | | 18 | | | 15 (Vergleich) |
| VI.8 | 40 | | 27 | | | | | 18 | | | 15 |
| VI.9 | 40 | | | | 27 | | | 18 | | | 15 |
| VI.10 | 40 | | | | 27 | | | | 18 | | 15 |
| VI.11 | 40 | | | | 27 | | | | | 18 | 15 |

*)Comparison

We claim:
1. Thermoplastic moulding compositions of
A) from 10 to 95% by weight of a vinyl chloride polymer and
B) from 90% to 5% by weight of one member selected from the group consisting of a graft polymer of styrene and acrylonitrile grafted onto polybutadiene, a rubber polymer of butadiene and acrylonitrile, and a mixture thereof, wherein B) has been prepared by emulsion polymerisation in the presence of emulsifiers obtained by the reaction of 1 mol of a diol corresponding to formula (I)

HO—M—OH  (I), wherein
M stands for

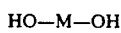

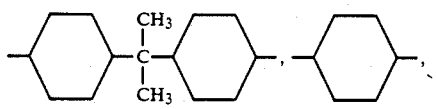

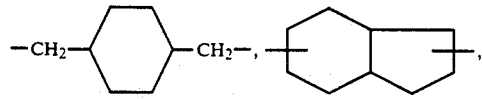

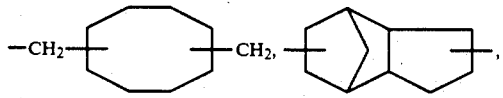

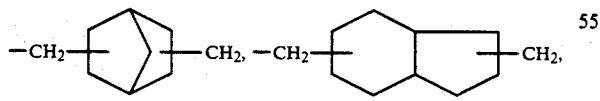

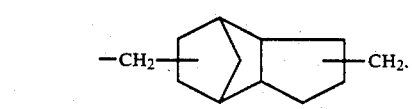

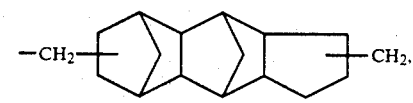

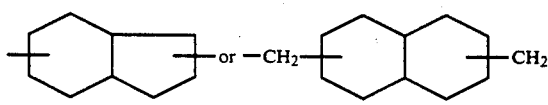

with 2 mol of a carboxylic acid anhydride corresponding to formula (II), (III) or (IV) or mixtures thereof,

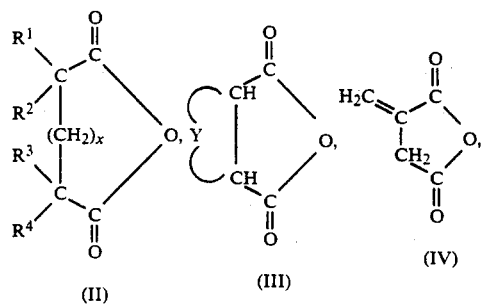

wherein, when X=0:
$R^1$, $R^2$, $R^3$ and $R^4$ denote hydrogen or
$R^1$ and $R^3$, which may be identical or different, denote hydrogen or $C_1$ to $C_{35}$ alkyl or alkenyl and $R^2$ and $R^4$ denote hydrogen or
$R^1$ and $R^4$ denote a chemical bond and $R^2$ and $R^3$ form an o-phenylen group together with the carbon atoms, and
when x=1:
$R^1$, $R^2$, $R^3$ and $R^4$ denote hydrogen and
Y stands for

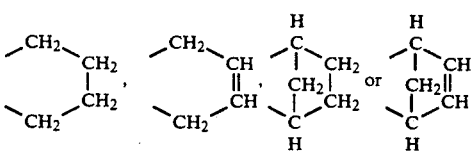

at temperatures from 100° to 300° C. under an inert gas followed by conversion of the resulting compounds into alkali metal or ammonium salts.
2. Thermoplastic moulding compounds according to claim 1, wherein the emulsifier used for preparing B) by emulsion polymerisation is

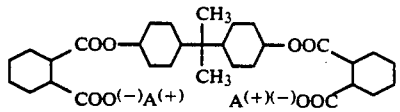

wherein A=alkali metal or ammonium.

3. Shaped articles made from the moulding composition of claim 1.

4. Thermoplastic moulding compositions of claim 1 wherein component B) is a rubber polymer of butadiene and acrylonitrile and the emulsifier is the bis-Na salt of the reaction product of 1 mol of perhydro-bisphenol A and 2 mol of hexahydrophthalic acid anhydride.

5. Thermoplastic moulding compositions of claim 1 wherein component B) is a mixture of a graft polymer of styrene and acrylonitrile grafted onto polybutadiene and a rubber copolymer of butadiene and acrylonitrile and the emulsifier is the bis-Na salt of the reaction product of 1 mol of perhydro-bisphenol A and 2 mol of hexahydrophthalic acid anhydride.

6. Thermoplastic moulding compositions of claim 1 wherein the emulsifier has the formula:

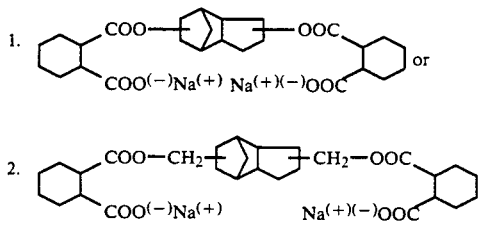

7. Thermoplastic moulding compositions of claim 6 wherein component B) is a graft polymer of styrene and acrylonitrile grafted onto polybutadiene and the emulsifier is a compound of formula 1.

8. Thermoplastic moulding compositions of claim 1 wherein component B) is a graft polymer of styrene and acrylonitrile grafted onto polybutadiene and the emulsifier is a compound of formula 2.

9. Thermoplastic moulding compositions of claim 6 wherein component B) is a rubber polymer of butadiene and acrylonitrile and the emulsifier is a compound of formula 1.

10. Thermoplastic moulding compositions of claim 6 wherein component B) is a rubber polymer of butadiene and acrylonitrile and the emulsifier is a compound of formula 2.

11. Thermoplastic moulding compositions of claim 6 wherein component B) is a mixture of a graft polymer of styrene and acrylonitrile grafted onto polybutadiene and a rubber copolymer of butadiene and acrylonitrile and the emulsifier is a compound of formula 1.

12. Thermoplastic moulding compositions of claim 6 wherein component B) is a mixture of a graft polymer of styrene and acrylonitrile grafted onto polybutadiene and a rubber copolymer of butadiene and acrylonitrile and the emulsifier is a compound of formula 2.

13. Thermoplastic moulding compositions of claim 1 wherein component B) a graft polymer of styrene and acrylonitrile grafted onto polybutadiene and the emulsifier is the reaction product of bis-hydroxymethyl-hexahydro-4,7-methanoindane and hexahydrophthalic acid anhydride.

14. Thermoplastic moulding compositions of claim 1 wherein component B) is a rubber polymer of butadiene and acrylonitrile and the emulsifier is the reaction product of bis-hyrdoxymethyl-hexahydro-4,7-methanoindane and hexahydrophthalic acid anhydride.

15. Thermoplastic moulding compositions of claim 1 wherein component B) is a mixture of a graft polymer of styrene and acrylonitrile grafted onto polybutadiene and a rubber copolymer of butadiene and acrylonitrile and the emulsifier is the reaction product of bis-hyrdoxymethyl-hexahydro-4,7-methanoindane and hexahydrophthalic acid anhydride.

16. A thermoplastic moulding composition as claimed in claim 1, wherein B is a mixture of a graft polymer of styrene and acrylonitrile grafted on to polybutadiene and wherein the emulsifier used for preparing graft polymer B, by emulsion polymerization is

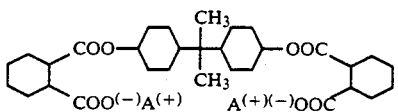

wherein A is Na$^{(+)}$.

* * * * *